Figure 1:
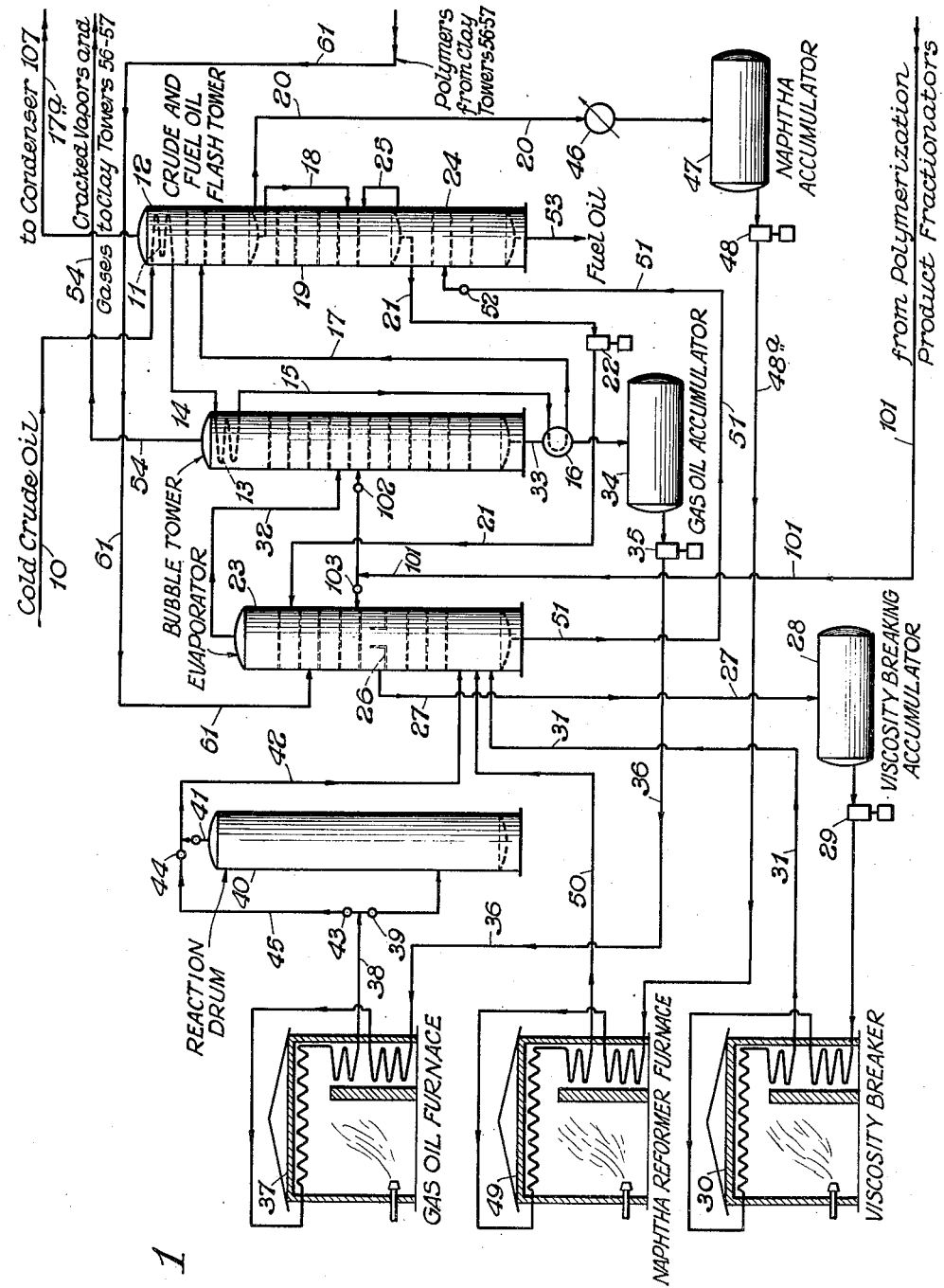

May 30, 1939. R. F. RUTHRUFF 2,160,286
CONVERSION OF HYDROCARBON OILS INTO GASOLINE
Original Filed Dec. 17, 1934 2 Sheets-Sheet 1

INVENTOR
Robert F. Ruthruff
BY
ATTORNEY

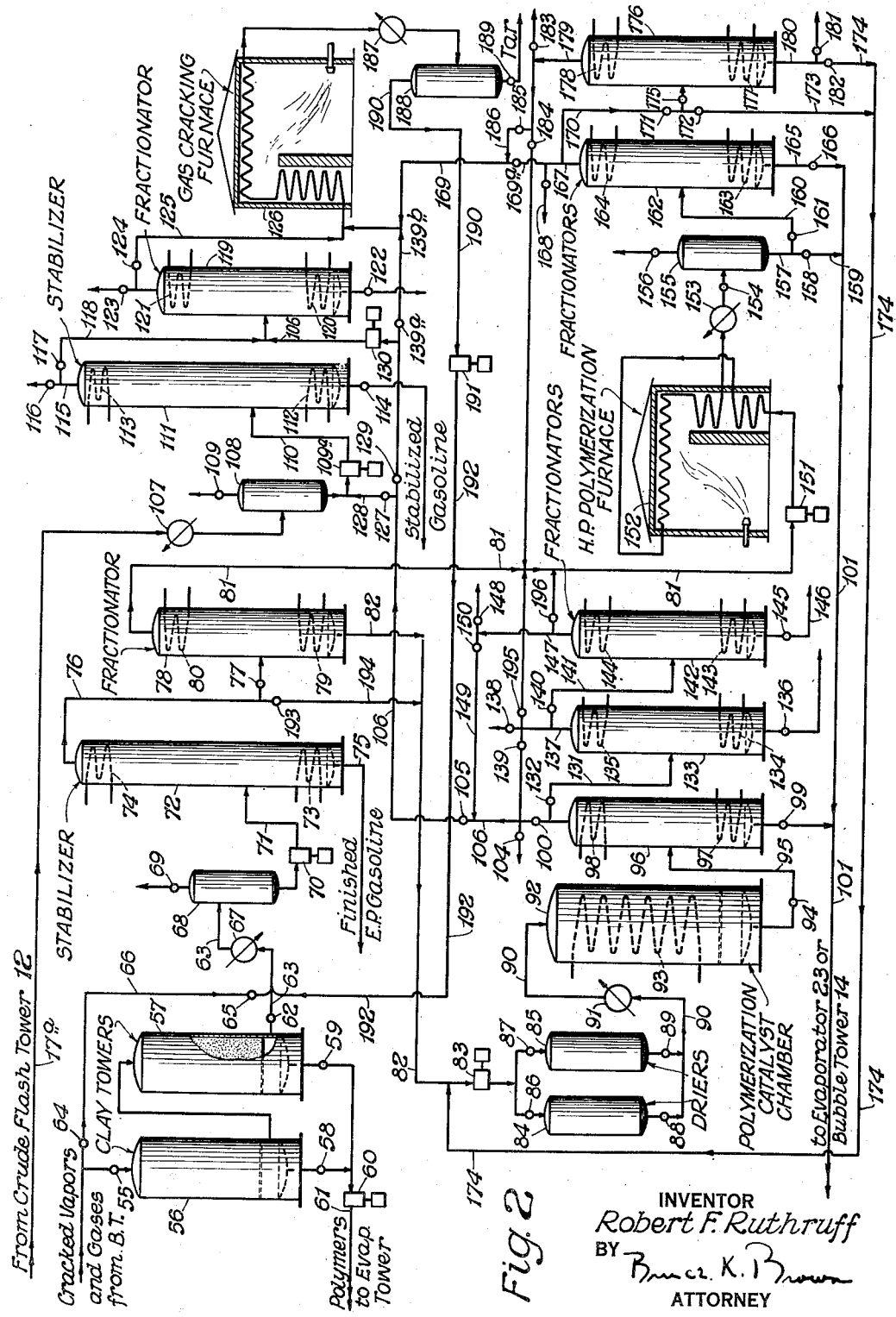

Patented May 30, 1939

2,160,286

UNITED STATES PATENT OFFICE 2,160,286

CONVERSION OF HYDROCARBON OILS INTO GASOLINE

Robert F. Ruthruff, Hammond, Ind., assignor to Standard Oil Company, Chicago, Ill., a corporation of Indiana Application December 17, 1934, Serial No. 757,902
Renewed August 11, 1938

13 Claims. (Cl. 196—10)

This invention relates to an improvement in the conversion of heavy oils into gasoline. More specifically, it relates to an improved combination of an oil cracking unit; preferably a complete unit of the type which utilizes crude oil as charging stock and eliminates gasoline and heavy fuel oil as its principal liquid products, together with one or two gas polymerization units functioning to convert the gas from the cracking unit to additional liquid products.

Briefly described, my improved process is characterized by the fact that I take the gas streams from the cracking section of the oil cracking unit and subject them to polymerization, returning the liquid products from the polymerization section to the cracking system. The gas streams from the cracking section, preferably after elimination of methane and hydrogen, are preferably separated into two fractions, one of which contains ethylene as a predominating unsaturated constituent, the other fraction containing propylene-butylene as its predominating unsaturated constituents. I preferably subject the latter fraction to catalytic polymerization at relatively low temperatures and pressures and the former fraction to non-catalytic polymerization at relatively high temperatures and pressures. I prefer to combine the total liquid products, i. e., gasoline and heavier, from both polymerization systems and return them to the cracking system whereby polymerization products heavier than gasoline are subjected to cracking and polymerized products of gasoline boiling range are eliminated from the system in admixture with the cracked gasoline.

Unconverted gases from the polymerization section or sections may be eliminated from the system or may be recovered and subjected to a high temperature gas cracking step in order to generate additional unsaturated gases which may be returned to the polymerization section or sections. In case I operate such a gas cracking step, the unconverted gases from the polymerization section or sections will ordinarily be fractionated and recovered in conjunction with the saturated gases from the crude oil which are recovered by fractionation of the light virgin gasoline from the crude oil.

By means of my improved combination process considerable increases in the yield and quality of the total gasoline obtained from the crude oil are realized. Since ethylene is not readily converted by improved catalysts which rapidly and smoothly convert higher gaseous olefins to liquids, my combination of high pressure polymerization and catalytic polymerization with the oil cracking system leads to optimum results. Furthermore, by the catalytic polymerization step I may eliminate all, or essentially all, of butylene and iso-butylene from the cracked gasoline produced by the system. Since butylene and iso-butylene have a higher vapor pressure than butane and iso-butane this permits increasing the butane content of the gasoline whereby its volatility and starting qualities may be improved without encountering difficulties from excess uncontrolled volatility as reflected in practice by tendency to "vapor-lock" automotive engines. The mixed polymerized and cracked gasoline produced by my system also usually has improved anti-knock value as compared to ordinary cracked gasoline. I also clay treat the vapors from the gasoline from the cracking unit and I have found that advantages in operation are obtained by clay treating the cracked gasoline vapors in admixture with vapors of polymerized gasoline.

The operation of my process will be understood from the following detailed description and reference to the drawings attached hereto and which form part of this specification, Figure 1 and Figure 2 taken together representing a diagrammatic elevational view of apparatus suitable for carrying out my process, Figure 1 representing the oil cracking section of the system while Figure 2 represents the gas polymerizing and gas cracking sections of the system.

The oil cracking system of my process may be varied in accordance with the type of crude handled and the other requirements of the particular situation. An arrangement which I ordinarily prefer is as follows:

Referring first to Figure 1, cold crude oil is introduced through line 10 and preferably is preheated by passing through reflux exchanger or coils 11 in the upper section 12 of the crude flash tower, then through reflux exchanger coils 13 in bubble tower 14, then through line 15 and heat exchanger 16 wherein additional heat is picked up from the bottoms from bubble tower 14, then through line 17 into upper section 12 of the crude flash tower. In this section 12 of the tower light virgin naphtha plus all of the gases present in the crude are flashed off and are removed through line 17a. The unvaporized material is withdrawn from the bottom of section 12 through line 18, and passes to a low point in the middle section 19 of the flash tower, where vapors of virgin heavy naphtha are flashed off and are withdrawn from the upper part of section 19 through line 20. The residual unvaporized portion of the crude is withdrawn from the lower part of section 19 through line 21 and introduced by pump 22 into an elevated point in evaporator tower 23. Vapors of heavy gas oil flashed off from the final cracked fuel oil in the lower section 24 of the flash tower rise through line 25 into the middle section 19, thus providing additional heat for stripping heavy naphtha from the crude oil in section 19 and being themselves condensed and withdrawn through line 21.

In the evaporator 23 the gas oil and similar constituents of the crude oil are vaporized and the heavy residual portion of the crude is withdrawn from trap-out tray 26 by line 27 and goes to the so-called viscosity breaker accumulator drum 28 from which it is pumped by pump 29 through viscosity breaker furnace 30 wherein it is heated to temperatures of 850° to 925° F. while under pressures of 100 to 750 lbs. per sq. in. Appreciable conversion of heavy oils to gasoline takes place in the viscosity breaker furnace, ordinarily about 5 to 15% of the heavy residue being converted to gasoline. Another important function of this furnace, however, is to "viscosity break" the heavy residue, i. e., to reduce its viscosity by moderate cracking. All products from the viscosity breaker furnace 30 pass through line 31 back to the lower section of the evaporator 23 below trap-out tray 26.

Vapors leaving the evaporator through line 32 include all gasoline formed in the cracking system, together with all gas oil, and are introduced through line 32 into the middle section of bubble tower 14. Unconverted gas oil from the cracking furnaces, together with fresh gas oil distilled in evaporator 23 from the crude residuum charged to the evaporator 23 through line 21, are condensed in bubble tower 14 and are withdrawn from the tower through line 33 and preferably through heat exchanger 16 to gas oil accumulator drum 34 from which the gas oil is pumped by pump 35, through line 36, to the gas oil furnace 37. In furnace 37 the gas oil is subjected to cracking under relatively severe conditions, i. e., temperatures of 900–1050° F. while under pressure of 100–750 lbs. per sq. in. or more, the rate of flow being such that a conversion of about 15% to 40% of the gas oil to gasoline is realized in one passage through the furnace. Products from the gas oil furnace 37 are withdrawn through line 38 and ordinarily are passed through valve 39 to unheated reaction drum 40 wherein additional time for the cracking reactions is afforded. Products leave the reaction drum through valve 41 and line 42, being introduced into a low point in evaporator 23 below trap-out tray 26. I may, however, eliminate reaction drum 40 by closing valves 39 and 41 and opening valves 43 and 44 in by-pass 45.

The heavy virgin naphtha vaporized from the crude oil in section 19 of the flash tower and withdrawn through line 20, is condensed by cooler 46 and passes to naphtha accumulator drum 47 from which it is withdrawn and pumped by pump 48 through line 48a to naphtha reformer furnace 49 wherein it is subjected to cracking at temperatures of 950 to 1100° F. while under pressures of 200 to 1500 lbs. per sq. in. to the end that the principal products are gasoline and gas and the antiknock value of the virgin naphtha is materially increased. The products are withdrawn from furnace 49 through line 50 and introduced into a low point of evaporator 23 below trap-out tray 26.

All of the gasoline formed in the three cracking furnaces and most of the gas oil are vaporized and pass out of the evaporator through line 32 to the bubble tower 14 but some of the heavy gas oil may be condensed in the evaporator 23 and trapped out by tray 26 and charged to the viscosity breaker furnace 30. The unvaporized cracked residuum or tar plus some unvaporized heavy gas oil are withdrawn from the bottom of evaporator 23 through line 51 and valve 52 and pass to the bottom section 24 of the fuel oil flash tower which operates substantially at atmospheric pressure. In this section all remaining gas oil is flash distilled from the cracked products as previously described, and heavy residual fuel oil is withdrawn from the system through line 53.

Cracked gasoline vapors and gas are removed from the top of bubble tower 14 through line 54 and pass preferably through valve 55 into clay towers 56 and 57 wherein undesirable gum forming constituents in the gasoline are polymerized and removed in liquid form through valves 58 and 59, these liquid polymers being returned by pump 60 in line 61 to the evaporator 23 or to some other convenient point in the cracking system whereby these liquid polymers are recracked to gasoline. The clay treating towers may be eliminated from the system by closing inlet valve 55 and valve 62 in exit line 63 and opening valves 64 and 65, in by-pass 66.

The gasoline vapors in line 63 pass through condenser and cooler 67 which may be a water cooled condenser pure and simple or may combine cooling by heat interchange (with cooler streams in the cracking system) followed by water cooling. The condensed cracked products, together with any uncondensed gases, pass from condenser 67 through line 63 to separator 68 without any reduction in pressure, uncondensed gases being withdrawn from separator 68 through offtake 69, said gases consisting predominatingly of hydrogen and methane. The liquid condensates are removed from separator 68 and passed by pump 70 through line 71 to stabilizer 72 which is provided with suitable bottom heating means 73 and top cooling means 74, whereby the liquid condensate is fractionated and finished stabilized end point gasoline may be withdrawn through line 75 from the bottom of stabilizer 72, while undesired light constituents, comprising ethylene, propylene and in some instances butylene together with the corresponding saturated hydrocarbons, are withdrawn from the top of stabilizer 72 through line 76, the pressure and temperature in stabilizer 72 being suitably regulated to this end. Although I have stated that finished stabilized gasoline is withdrawn from separator 72, such gasoline ordinarily preferably containing a considerable proportion of the total butane and butylene present in the cracked products, for reasons which will later appear I may also operate stabilizer 72 so as to send most of the butane and butylene overhead through line 76, in which case the gasoline withdrawn through line 75 will be deficient in volatile light ends.

The overhead vapors leaving stabilizer 72 through line 76 are ordinarily introduced through valve 77 into fractionator 78 which is provided with suitable bottom heating means 79 and top cooling means 80 whereby a fraction comprising predominatingly ethane and ethylene is removed in a vaporous or gaseous form from the top thereof through line 81 while a condensate consisting predominatingly of propane and propylene, together with any butane and butylene present, is withdrawn from the bottom thereof through line 82.

In the operation of the aforedescribed cracking and fractionation system, I will ordinarily maintain a pressure of 100 to 750 lbs. per sq. in. on reaction drum 40 while evaporator 23 and bubble tower 14 will ordinarily be operated under about 200 lbs. per sq. in. pressure, which pressure will ordinarily be continued without reduction through the clay towers 56 and 57 and the separator 68. Stabilizer 72 and fractionator 78 will ordinarily be operated at pressures of approximately 100–350 lbs. per sq. in. and condensing and pumping means not shown may be introduced in line 76 if it is desired to operate fractionator 78 at a higher pressure than stabilizer 72.

The condensed liquid materials removed from fractionator 78 through line 82, comprising propane and propylene, and containing in some cases substantial proportions of butylene and butane, are passed by pump 83 to the catalytic polymerization step of my process. The materials are first dried by passing through driers 84 and 85 which are arranged in parallel and are provided with valves 86, 87, 88 and 89, whereby either one of driers 84 or 85 may be cut out of the system for refilling without shutting down the operaton. Th dried materials are then passed through line 90 and optionally through heater or heat interchanger 91 into the catalytic polymerization chamber 92 which is ordinarily provided with internal cooling means 93. I have illustrated a chamber containing a mass of catalyst with internal cooling means but I may also use other arrangements and, for example, I may position my catalyst in tubes which are surrounded by the cooling medium and I may also maintain my catalyst in molten liquid form without the use of any support or carrier and bubble my gases therethrough.

As catalyst I prefer to use substances of the aluminum halide stable double salt type wherein the other metallic halide may be sodium chloride, lithium chloride, sodium bromide, cuprous chloride, antimony bromide, mercuric bromide, etc., the compound sodium chloroaluminate being a typical example of this type of catalyst. The catalysts of this type are characterized by the fact that they exert an active polymerizing action on the heavier gaseous olefines, i. e., propylene and butylene, but have a relatively slight polymerizing action on ethylene. The particular catalyst used forms no part of my invention except that I prefer to use a catalyst of the above described type having a selective action on the heavier gaseous olefins.

The catalyst reaction chamber 92 is preferably operated under pressures of 200 to 1000 lbs. per sq. in. and at temperatures of 200°–550° F. and the gas mixture is charged thereto at a rate equal to 400–8000 cubic feet of free gas (i. e., measured at atmospheric pressure and 60° F.) per cubic ft. of free catalyst volume per hour.

Reaction products removed from chamber 92 pass through valve 94 and line 95 into fractionator 96 which is provided with suitable bottom heating means 97 and top cooling means 98 and is operated under pressures of 50 to 350 pounds per sq. inch. I may operate fractionator 96 so as to remove all liquid hydrocarbons comprising gasoline and heavier through the bottom outlet valve 99, removing all unconverted gases, including butane and lighter, through the top outlet valve 100. In this case the gasoline and gas oil formed by the catalytic polymerization, together with any heavy or tarry materials, are passed through line 101 back to the previously described cracking system and are either introduced through valve 102 into bubble tower 14 or through valve 103 into evaporator 23. The latter arrangement will be used if the products contain any substantial quantity of materials heavier than gas oil. Pumping means may be provided in line 101 if necessary. By this means the gasoline produced by the catalytic polymerization is fractionated and stabilized in the aforedescribed fractionating steps of the cracking system and is recovered and removed from the system through the line 75 in admixture with the gasoline formed by cracking. Furthermore, any materials heavier than gasoline which are formed by the catalytic polymerization are ultimately returned to the cracking furnace 37 for conversion into additional amounts of gasoline.

The unconverted gases removed from fractionator 96 through valve 100 may be removed from the system through valve 104 for suitable outside treatment or disposal but may also be passed through valve 105 in line 106 to a fractionating system which is operated in conjunction with the previously described oil cracking system for the rectification of the gases and light virgin naphtha flashed from the crude oil in section 12 of the flash tower. This fractionating system may be described as follows:

Vapors from section 12 of the crude flash tower, being removed through line 17a, are cooled by condenser 107 and passed to separator 108 from the top of which, through line 109, dry gas consisting essentially of methane is removed. The light virgin naphtha is removed from the bottom of the separator 108 by pump 109a and is passed through line 110 to stabilizer 111 which is provided with suitable bottom heating means 112 and top cooling means 113. From the bottom of stabilizer 111 the stabilized light virgin naphtha from the crude is withdrawn through outlet valve 114, and gas consisting predominatingly of propane and ethane, together (under certain conditions) with some butane, is removed through line 115 and may be removed from the system for suitable outside treatment or disposal through valve 116 but is preferably passed through valve 117 in line 118 to fractionator 119 which is provided with suitable bottom heating means 120 and top cooling means 121 whereby butane is removed as a liquid bottom product through outlet 122 and propane, together with any ethane present, is removed as a gaseous top product and may be eliminated from the system through valve 123 for suitable outside disposal or may be passed through valve 124 in line 125 to the gas cracking furnace 126 which will be later described in more detail.

Returning to the fractionator 96, the unconverted and essentially saturated gases removed through outlet 100 may be passed through line 106 into the just described light virgin naphtha stabilizing system, being passed either through valve 127 and line 128 to the inlet of pump 109a or being passed through valve 129 and pump 130 directly into the fractionator 119. By this means all saturated gases, i. e., ethane, propane and butane, are recovered in admixture with similar gases present in the crude oil and which have been obtained in the stabilization of the light virgin naphtha.

Instead of passing gases and vapors from fractionator 96 through outlet 100 as above described, I may pass them through line 131 and valve 132 into fractionator 133 which is provided with suitable bottom heating means 134 and with suitable top cooling means 135 whereby butane may be withdrawn as a liquid condensate through outlet 136 and removed from the system for suitable outside disposal, and propane together with any ethane may be removed through line 137 and may be eliminated from the system for suitable outside disposal through valve 138 or may be passed through valve 139 to line 106 for treatment as previously described in stabilizer 111 and/or fractionator 119 or may be passed directly to gas cracking furnace 126 through valve 139a in line 139b.

I may also operate fractionators 96 and 133 under such conditions that only gas oil is obtained as a bottom product from fractionator 96, gasoline vapors passing overhead and being recovered as a bottom product from fractionator 133. The gas oil from fractionator 96 will be returned through line 101 to evaporator 23 or bubble tower 14. In this case the top product from fractionator 133 will contain all excess butane and lighter gases and I may pass this overhead product through valve 140 in line 141 into fractionator 142 which is provided with suitable bottom heating means 143 and top cooling means 144 whereby excess butane is removed as a bottom product and withdrawn from the system for suitable disposal through outlet valve 145 in line 146, while propane together with any ethane is removed as vapor through outlet 147 and may be eliminated from the system for suitable disposal through valve 148 or may be passed through line 149 and valve 150 to line 106 to stabilizer 111 and/or fractionator 119 or to gas cracking furnace 126 directly, as previously described.

As was stated in connection with the description of fractionator 78, the gas fraction removed therefrom through line 81, containing ethylene as its predominant olefin constituent, is passed to the intake of pump 151 whereby it is passed to the high pressure polymerization furnace 152. Therein it is subjected to non-catalytic polymerization at pressures of 1000 to 3000 pounds per square inch and temperatures of 850° to 1100° F. I have illustrated the furnace 152 as being provided with a soaking coil type of flow but instead of this, or in addition to this, I may utilize an unheated reaction drum (not shown) following the furnace. Products from the high pressure polymerization furnace 152 are passed through water-cooled condenser 153 or equivalent cooling means following which the pressure is reduced by valve 154 and the liquid products and unconverted gases are passed to separator 155 whereby in the pressure and temperature are such that a dry gas containing predominatingly methane and hydrogen is removed from the top through offtake 156, liquid products and condensed heavy gases being removed through bottom offtake 157. These liquid products and unconverted gases may be passed through valve 158 and line 159 to line 101 whereby they are returned to the evaporator 23 or bubble tower 14 of the cracking system. Ordinarily, however, I prefer to fractionate unconverted gases separately and to return only the liquid polymerization products to the cracking system. To this end I pass products from the bottom of separator 155 through line 160 and valve 161 to fractionator 162 which is provided with suitable bottom heating means 163 and top cooling means 164, gasoline, gas oil and any heavier constituents of the high pressure polymerization products being withdrawn through line 165 and valve 166 to line 101 whereby they are returned to evaporator 23 or bubble tower 14 and the gasoline is recovered in admixture with the cracked gasoline, while the liquid polymerization products heavier than gasoline are subjected to cracking to obtain additional amounts of gasoline.

Gaseous products removed from the top of fractionator 162 through line 167 will consist mainly of ethane, propane, and butane, together with small amounts of the corresponding olefins which have not been polymerized in furnace 152. I may eliminate these gases from the system through valve 168 or I may pass them through line 169 and valve 169a to the inlet of gas cracking furnace 126 which will be later described in more detail. I may also pass them through line 170, valve 171 and valve 172 in line 173 to line 174 whereby they are passed to the inlet of pump 83 which charges the catalytic polymerization reaction chamber and whereby any propylene or butylene contained therein will be catalytically polymerized while other gaseous constituents will be given suitable ultimate disposition by the previously described fractionating apparatus following polymerization chamber 92, i. e., will be eliminated from the system or will be cracked in gas cracking furnace 126 to generate additional olefin gases.

I may also pass gases from fractionator 162 through line 170, valve 171 and valve 175 (using pumping means, not shown, if necessary) to fractionator 176 which is provided with suitable bottom heating means 177 and suitable top cooling means 178 and whereby these gases will be separated and ethane, together with any ethylene, will be withdrawn from the top through line 179 while any propane and butane, together with any propylene and butylene, will be withdrawn as a liquid condensate through offtake 180 (or I may eliminate ethane-propane through line 179 and withdraw butane through line 180), and optionally eliminated from the system through valve 181, but preferably passed through valve 182 to line 174 whereby it is returned to the catalytic polymerization chamber for treatment as previously described.

The ethane fraction removed from fractionator 176 through line 179 may be eliminated from the system through valve 183 but preferably is passed either through valve 184 whereby it is recycled to the high pressure polymerization furnace 152 or through valve 185 in line 186 whereby it is passed to line 169 and thereby to the gas cracking furnace 126 later described in detail. If I recycle part of this fraction through valve 184 to the high pressure polymerization furnace 152 it will be necessary to pass another part thereof through valve 185 to the gas cracking furnace 126, or to eliminate a part thereof from the system through valve 183, in order to prevent a gradual building up of ethane in the feed to the high pressure polymerization furnace 152. The balance between these possibilities will be determined mainly by the ethylene content of the unconverted gas from high pressure polymerization furnace 152 and the higher this ethylene content the larger the proportion of gas which I will ordinarily recycle to the furnace 152.

Although I do not limit myself thereto, as an added element of my process I prefer to operate my process in conjunction with a gas cracking step, reference having previously been made to gas cracking furnace 126 wherein this step is carried out. This furnace is operated at pressures of 0–100 pounds per square inch above atmospheric and temperatures of 1350–1650° F. The gas charged to the furnace is predominatingly saturated in character and ordinarily I prefer not to introduce any gas streams containing a large or predominating proportion of methane since methane does not yield readily to cracking to form olefinic hydrocarbons. Furthermore, I prefer not to charge any substantial proportion of butane to furnace 126 since the amount of butane produced in my system can ordinarily be blended in toto in the finished gasoline and there is therefore no advantage in subjecting it to cracking to form olefines for repolymerization to gasoline. I therefore prefer to charge gas cracking furnace 126 with a mixture consisting predominatingly of ethane and propane which may be obtained from fractionator 119 (by line 125), from fractionator 162 (via offtake 167, valve 169a and line 169), from fractionator 133 (via outlet 137, valve 139, valve 105, line 106, valve 129, valve 139a, and through line 139b), from fractionator 142 (via outlet 147, line 149, valve 150, line 106, valve 106, valve 139a, and through line 139b) or from fractionator 176 (via offtake 179, valve 185 and lines 186 and 169). It will also be seen that, as previously described, the gas from fractionator 119 may contain saturated unconverted gases from catalytic polymerization chamber 92 which are eliminated in fractionators 96, 133 and/or 142 and are conveyed to fractionator 119 through line 106 (or via line 106, valve 127, line 128, separator 108 and stabilizer 111). By these various arrangements I preferably charge gas cracking furnace 126 with all ethane and propane produced in my system, including that originally present in the crude oil and also the larger amounts formed by cracking section of my process and recovered from the products of the catalytic polymerization chamber 92 and/or the high pressure polymerization furnace 152.

Following the gas cracking furnace 126 suitable cooling means 187 are used which may comprise a direct oil spray cooler and/or suitable indirect cooling means, following which the cooled gases are introduced into tar separator 188 wherein tar is removed from the system through offtake 189 and gases containing a large proportion of gaseous olefines, predominatingly ethylene, are removed through line 190 for treatment by high pressure polymerization in furnace 152. I prefer to separate inert gases, such as methane and hydrogen, from this gas prior to introduction into furnace 152 and may do so by any convenient means but preferably I introduce said gases by pump 191 and line 192 into separator 68 wherein it joins gases and liquid products from the cracking system whereby its methane and hydrogen content are eliminated in conjunction with methane and hydrogen from the cracking system, and the ethylene formed in gas cracking furnace 126 thus ultimately passes to high pressure polymerization furnace 152 via line 81 in conjunction with similar ethylenic gases produced in the cracking system.

I have previously stated that I prefer to operate stabilizer 72 so that overhead gases, consisting predominantly of ethane, ethylene, propane and propylene, are passed into fractionator 78 and are therein separated into an ethylenic gaseous fraction which is charged through line 81 to high pressure polymerization furnace 152, and a propylenic liquid fraction which is withdrawn through line 82 and charged to the catalytic polymerization chamber 92. By closing valve 77 immediately prior to fractionator 78 and opening valve 193 in line 194 I may, however, pass all gases from stabilizer 72 and line 76 directly to line 82 entering the catalytic polymerization system. In this arrangement the higher gaseous olefines are polymerized to liquids in the catalytic polymerization chamber 92 while the ethylene present in the feed gas is converted to a minor degree only. In this case I may operate the fractionating system following the catalytic reaction chamber 92, as exemplified by fractionators 96, 133 and 142, so as to separate an ethylenic gas fraction which is passed directly to the inlet of pump 151 supplying the high pressure polymerization furnace 152, either from fractionator 133 through offtake 137 and valved line 195, or from fractionator 142 through offtake 147, and valve 196.

As previously stated, I prefer to operate my improved process using the catalytic polymerization step, the high pressure non-catalytic polymerization step and the gas cracking step, all in conjunction with an oil cracking step as previously described. I may, however, operate only the catalytic polymerization step or the catalytic polymerization step plus the high pressure non-catalytic polymerization step, in conjunction with my oil cracking step as will be evident from the foregoing description.

The primary advantages of my improved process are that I obtain increased yield of gasoline of improved quality from the crude oil; that I eliminate butylene from this gasoline whereby I may increase its butane content and thereby improve its volatility and starting characteristics without increasing its vapor-locking tendency in internal combustion engine system; that my gasoline has improved antiknock value; and that I accomplish these results with a minimum of apparatus and a maximum of economy of fuel and other operating costs.

It will be understood that I am not limited in my invention as above described except as set forth in the claims as follows:

I claim:

1. In a combined oil cracking and gas polymerization process, the steps comprising heating a flowing stream of hydrocarbon oil during its flow through an elongated passageway to a cracking temperature while maintained under a super-atmospheric pressure, maintaining the oil stream at said temperature and under said pressure until the desired conversion into motor fuel products and normally gaseous hydrocarbons is effected, thereafter passing the stream of reaction products to a separating zone wherein heavy hydrocarbon products are separated in liquid form and lighter hydrocarbon products are separated in vapor form, collecting said heavy hydrocarbon products and recycling a part of them for further cracking, separately withdrawing vapors from said separating zone and fractionating them in a fractionating zone to separate therefrom as separate fractions liquid motor fuel products and an admixture of normally gaseous hydrocarbons containing olefins, catalytically polymerizing said admixture of normally gaseous hydrocarbons containing olefins, separating motor fuel and higher boiling polymer products from lighter products of the effluent from the polymerization step and returning said motor fuel and higher boiling polymer products to said separating zone, and recovering from said fractionating zone said motor fuel polymer in admixture with motor fuel products formed in the oil cracking step.

2. A process in accordance with claim 1 wherein the catalytic polymerization of the admixture of normally gaseous hydrocarbons containing olefins is effected at temperatures of 250 to 550° F. and pressures of 200 to 1,000 pounds per square inch.

3. In a combined oil cracking and gas polymerization process, the steps comprising heating a flowing stream of hydrocarbon oil during its flow through an elongated passageway to a cracking temperature while maintained under a super-atmospheric pressure, maintaining the oil stream at said temperature and under said pressure until the desired conversion into motor fuel products and normally gaseous hydrocarbons is effected, thereafter passing the stream of reaction products to a separating zone wherein heavy hydrocarbon products are separated in liquid form and lighter hydrocarbon products are separated in vapor form, collecting said heavy hydrocarbon products and recycling a part of them for further cracking, separately withdrawing vapors from said separating zone and fractionating them in a fractionating zone to separate therefrom as separate fractions liquid motor fuel products containing substantially no butane and an admixture of normally gaseous hydrocarbons containing olefins and butane, catalytically polymerizing said admixture of normally gaseous hydrocarbons to form polymer products boiling within the gasoline range, separating gasoline and higher boiling polymer products as one fraction and liquid butane as a second fraction from the products of the polymerization step, returning said gasoline and higher boiling polymer products to said separating zone, recovering from said fractionating zone said gasoline polymer in admixture with the motor fuel products containing substantially no butane, and blending butane with said admixture of gasoline polymers and motor fuel products to form a motor fuel product of desired volatility.

4. In a combined oil cracking and gas polymerization process, the steps comprising heating a flowing stream of hydrocarbon oil during its flow through an elongated passageway to a cracking temperature while maintained under a super-atmospheric pressure, maintaining the oil stream at said temperature and under said pressure until the desired conversion into gasoline-like products and normally gaseous hydrocarbons is effected, thereafter passing the stream of reaction products to a separating zone wherein heavy hydrocarbon products are separated in liquid form and lighter hydrocarbon products are separated in vapor form, collecting said heavy hydrocarbon products and recycling a part of them for further cracking, separately withdrawing vapors from said separating zone and fractionating them in a fractionating zone to separate therefrom as separate fractions the desired motor fuel products and an admixture of normally gaseous hydrocarbons containing olefins, subjecting said normally gaseous hydrocarbons containing olefins to catalytic polymerization to form liquid polymer products including motor fuel constituents, separating unconverted gases from the products of the catalytic polymerization step, subjecting said unconverted gases to thermal polymerization at elevated temperatures and high super-atmospheric pressures to form liquid polymer products including motor fuel constituents, returning liquid motor fuel products and heavier hydrocarbon products from both polymerization steps to said separating zone, and recovering from said fractionating zone motor fuel polymer products from both of said polymerization steps in admixture with motor fuel products produced in the oil cracking step.

5. In a combined oil cracking and gas polymerization process, the steps comprising heating a flowing stream of hydrocarbon oil during its flow through an elongated passageway to a cracking temperature while maintained under a super-atmospheric pressure, maintaining the oil stream at said temperature and under said pressure until the desired conversion into motor fuel products and normally gaseous hydrocarbons is effected, thereafter passing the stream of reaction products to a separating zone wherein vaporous constituents are separated from unvaporized constituents, fractionating said vaporized constituents in a fractionating zone to separate therefrom insufficiently cracked products as reflux condensate, returning at least a part of said reflux condensate for further cracking, separately withdrawing vaporous constituents remaining after said fractionation and passing them to a second fractionating zone to separate therefrom as separate fractions liquid motor fuel products and an admixture of normally gaseous hydrocarbons containing olefins, catalytically polymerizing said admixture of normally gaseous hydrocarbons containing olefins, separating motor fuel and higher boiling polymer products from lighter products of the effluent from the polymerization step and returning said motor fuel and higher boiling polymer products to the first fractionating zone and recovering from the second fractionating zone said motor fuel polymer in admixture with motor fuel products formed in the oil cracking step.

6. In a combined oil cracking and gas polymerization process, the steps comprising heating a flowing stream of hydrocarbon oil during its flow through an elongated passageway to a cracking temperature while maintained under super-atmospheric pressure, maintaining the oil stream at said temperature and under said pressure until the desired conversion to motor fuel products and normally gaseous hydrocarbons is effected, thereafter passing the stream of reaction products to a separating zone wherein vaporous constituents are separated from unvaporized constituents, fractionating said vaporized constituents in a fractionating zone to separate therefrom insufficiently cracked products as reflux condensate, returning at least a part of said reflux condensate for further cracking, separately withdrawing vaporous constituents remaining after said fractionation and passing them to a second fractionating zone to separate therefrom as separate fractions liquid motor fuel products and an admixture of normally gaseous olefin-containing hydrocarbons substantially free from hydrogen and methane, catalytically polymerizing the admixture of normally gaseous olefin-containing hydrocarbons substantially free from hydrogen and methane, separating motor fuel and higher boiling polymer products from lighter products of the effluent from the polymerization step and returning said motor fuel and higher boiling polymer products to the first fractionating zone and recovering from the second fractionating zone said motor fuel polymer products in admixture with motor fuel products formed in the oil cracking step.

7. In a combined oil cracking and gas polymerization process, the steps comprising heating a flowing stream of hydrocarbon oil during its flow through an elongated passageway to a cracking temperature while maintained under superatmospheric pressure, maintaining the oil stream at said temperature and under said pressure until the desired conversion to motor fuel products and normally gaseous hydrocarbons is effected, thereafter passing the stream of reaction products to a separating zone wherein vaporous constituents are separated from unvaporized constituents, fractionating said vaporized constituents in a fractionating zone to separate therefrom insufficiently cracked products as reflux condensate, returning at least a part of said reflux condensate for further cracking, separately withdrawing vaporous constituents remaining after said fractionation and passing them to a second fractionating zone to separate therefrom as separate fractions liquid motor fuel products and an admixture of normally gaseous olefin-containing hydrocarbons substantially free from hydrogen and methane, catalytically polymerizing said admixture of normally gaseous olefin-containing hydrocarbons substantially free from hydrogen and methane while maintained under an elevated pressure and at a temperature within the range of 200–550° F., separating motor fuel and higher boiling polymer products from lighter products of the effluent from the ploymerization step and returning said motor fuel and higher boiling polymer products to the first fractionating zone and recovering from the second fractionating zone said motor fuel polymer products in admixture with motor fuel products formed in the oil cracking step.

8. In a combined oil cracking and gas polymerization process, the steps comprising heating a flowing stream of hydrocarbon oil during its flow through an elongated passageway to a cracking temperature while maintained under superatmospheric pressure, maintaining the oil stream at said temperature and under said pressure until the desired conversion to motor fuel products and normally gaseous hydrocarbons is effected, thereafter passing the stream of reaction products to a separating zone wherein vaporous constituents are separated from unvaporized constituents, fractionating said vaporized constituents in a fractionating zone to separate therefrom insufficiently cracked products as reflux condensate, returning at least a part of said reflux condensate for further cracking, separately withdrawing vaporous constituents remaining after said fractionation and passing them to a second fractionating zone to separate therefrom as separate fractions liquid motor fuel products and an admixture of normally gaseous hydrocarbons comprising mostly $C_3$ and $C_4$ hydrocarbons, catalytically polymerizing said admixture of normally gaseous hydrocarbons comprising mostly $C_3$ and $C_4$ hydrocarbons, separating motor fuel and higher boiling polymer products from lighter products of the effluent from the polymerization step and returning said motor fuel and higher boiling polymer products to the first fractionating zone and recovering from the second fractionating zone said motor fuel polymer products in admixture with motor fuel products formed in the oil cracking step.

9. In a combined oil cracking and gas polymerization process, the steps comprising heating a flowing stream of hydrocarbon oil during its flow through an elongated passageway to a cracking temperature while maintained under a superatmospheric pressure, maintaining the oil stream at said temperature and under said pressure until the desired conversion into motor fuel products and normally gaseous hydrocarbons is effected, thereafter passing the stream of reaction products to a separating zone wherein heavy hydrocarbon products are separated in liquid form and lighter hydrocarbon products are separated in vapor form, collecting said heavy hydrocarbon products and recycling a part of them for further cracking, separately withdrawing vapors from said separating zone and fractionating them in a fractionating zone to separate therefrom as separate fractions liquid motor fuel products and an admixture of normally gaseous olefin-containing hydrocarbons substantially free from hydrogen and methane, catalytically polymerizing said admixture of normally gaseous hydrocarbons substantially free from hydrogen and methane, separating motor fuel and higher boiling polymer products from lighter products of the effluent from the polymerization step and returning said motor fuel and higher boiling polymer products to said separating zone, and recovering from said fractionating zone said motor fuel polymer in admixture with motor fuel products formed in the oil cracking step.

10. In a combined oil cracking and gas polymerization process, the steps comprising heating a flowing stream of hydrocarbon oil during its flow through an elongated passageway to a cracking temperature while maintained under superatmospheric pressure, maintaining the oil stream at said temperature and under said pressure until the desired conversion to motor fuel products and normally gaseous hydrocarbons is effected, thereafter passing the stream of reaction products to a separating zone wherein vaporous constituents are separated from unvaporized constituents, fractionating said vaporized constituents in a fractionating zone to separate therefrom insufficiently cracked products as reflux condensate, returning at least a part of said reflux condensate for further cracking, separately withdrawing vaporous constituents remaining after said fractionation and passing them to a second fractionating zone to separate therefrom as separate fractions liquid motor fuel products and an admixture of normally gaseous olefin-containing hydrocarbons substantially free from hydrogen and methane, catalytically polymerizing said admixture or normally gaseous olefin-containing hydrocarbons substantially free from hydrogen and methane, separating motor fuel and higher boiling polymer products from unconverted gases of the effluent from the catalytic polymerization step, subjecting said unconverted gases to thermal polymerization at elevated temperatures and high super-atmospheric pressures to form motor fuel and higher boiling polymer products, returning motor fuel and higher boiling polymer products from both polymerization steps to the first fractionating zone, and recovering from the second fractionating zone said motor fuel polymer products in admixture with motor fuel products formed in the oil cracking step.

11. In a combined oil cracking and gas polymerization process, the steps comprising heating a flowing stream of hydrocarbon oil during its flow through an elongated passageway to a cracking temperature while maintained under superatmospheric pressure, maintaining the oil stream at said temperature and under said pressure until the desired conversion to motor fuel products and normally gaseous hydrocarbons is effected, thereafter passing the stream of reaction products to a separating zone wherein vaporous constituents are separated from unvaporized constituents, fractionating said vaporized constituents in a fractionating zone to separate therefrom insufficiently cracked products as reflux condensate, returning at least a part of said reflux condensate for further cracking, separately withdrawing vaporous constituents remaining after said fractionation and passing them to a second fractionating zone to separate as separate fractions liquid motor fuel products and an admixture of normally gaseous olefin-containing hydrocarbons substantially free from hydrogen and methane, catalytically polymerizing said admixture of normally gaseous olefin-containing hydrocarbons substantially free from hydrogen and methane, separating motor fuel and higher boiling polymer products from unreacted gases of the effluent from the polymerization step, returning said motor fuel and higher boiling polymer products to the first fractionating zone, recovering from the second fractionating zone said motor fuel polymer in admixture with motor fuel products formed in the oil cracking step, thermally converting said unreacted gases into olefinic gases, and passing said olefinic gases to the second fractionating zone wherein they are recovered as part of the admixture of normally gaseous olefin-containing hydrocarbons substantially free from hydrogen and methane.

12. In a combined oil cracking and gas polymerization process, the steps comprising heating a flowing stream of hydrocarbon oil during its flow through an elongated passageway to a cracking temperature while maintained under a superatmospheric pressure, maintaining the oil stream at said temperature and under said pressure until the desired conversion into motor fuel products and normally gaseous hydrocarbons is effected, thereafter passing the stream of reaction products to a separating zone wherein heavy hydrocarbon products are separated in liquid form and lighter hydrocarbon products are separated in vapor form, collecting said heavy hydrocarbon products and recycling a part of them for further cracking, separately withdrawing vapors from said separating zone and fractionating them in a fractionating zone to separate therefrom as separate fractions liquid motor fuel products and an admixture of normally gaseous olefin-containing hydrocarbons substantially free from hydrogen and methane, catalytically polymerizing said mixture of normally gaseous olefin-containing hydrocarbons substantially free from hydrogen and methane, separating motor fuel and higher boiling polymer products from unreacted gases of the effluent from the polymerization step and returning said motor fuel and higher boiling polymer products to said separating zone, recovering from said fractionating zone said motor fuel polymer in admixture with motor fuel products formed in the oil cracking step, thermally converting said unreacted gases into olefinic gases, and passing said olefinic gases to said fractionating zone wherein they are recovered as a part of the admixture of normally gaseous olefin-containing hydrocarbons substantially free from hydrogen and methane.

13. In a combined oil cracking and gas polymerization process, the steps comprising heating a flowing stream of hydrocarbon oil during its flow through an elongated passageway to a cracking temperature while maintained under superatmospheric pressure, maintaining the oil stream at said temperature and under said pressure until the desired conversion to motor fuel products and normally gaseous hydrocarbons is effected, thereafter passing the stream of reaction products to a separating zone wherein vaporous constituents are separated from unvaporized constituents, fractionating said vaporized constituents in a fractionating zone to separate therefrom insufficiently cracked products as reflux condensate, returning at least a part of said reflux condensate for further cracking, separately withdrawing vaporous constituents remaining after said fractionation and passing them to a second fractionating zone to separate therefrom as separate fractions liquid motor fuel products and an admixture of normally gaseous olefin-containing hydrocarbons substantially free from hydrogen and methane, catalytically polymerizing said admixture of normally gaseous olefin-containing hydrocarbons substantially free from hydrogen and methane, separating motor fuel and higher boiling polymer products from unreacted gases of the effluent from the polymerization step, returning said motor fuel and higher boiling polymer products to the first fractionating zone, recovering from the second fractionating zone said motor fuel polymer in admixture with motor fuel products formed in the oil cracking step, thermally converting said unreacted gases into olefinic hydrocarbons, removing inert gases from said olefinic gases and polymerizing these olefinic gases along with said admixture of normally gaseous olefin-containing hydrocarbons substantially free from hydrogen and methane.

ROBERT F. RUTHRUFF.